United States Patent [19]
Schäfer et al.

[11] Patent Number: 5,874,682
[45] Date of Patent: Feb. 23, 1999

[54] TORQUE MEASURING DEVICE PARTICULARLY FOR A MULTISHAFT EXTRUDER

[75] Inventors: Manfred Schäfer, Schwieberdingen; Dieter Buchheit, Eberdingen, both of Germany

[73] Assignee: Werner & Pfleiderer GmbH, Stuttgart, Germany

[21] Appl. No.: 637,262

[22] Filed: Apr. 25, 1996

[30] Foreign Application Priority Data

Apr. 25, 1995 [DE] Germany .................. 195 15 130.5

[51] Int. Cl.⁶ ....................................................... G02L 1/22
[52] U.S. Cl. .................................. 73/862.338; 73/862.325
[58] Field of Search ...................... 73/862.191, 862.321, 73/862.338

[56] References Cited

U.S. PATENT DOCUMENTS

| | | | |
|---|---|---|---|
| 2,563,425 | 8/1951 | Schaevitz | 73/862.338 |
| 3,329,066 | 7/1967 | Wood III | 73/862.338 X |
| 3,857,280 | 12/1974 | Panzeri | 73/862.338 |
| 4,186,596 | 2/1980 | Bohringer et al. | 73/862.338 |
| 4,655,092 | 4/1987 | Taig | 73/862.338 |
| 4,754,652 | 7/1988 | Coulter et al. | 73/862.191 |
| 4,838,077 | 6/1989 | Shifflet et al. | 73/862.338 X |
| 5,524,485 | 6/1996 | Bernard et al. | 73/862.191 X |
| 5,650,573 | 7/1997 | Bruns et al. | 73/862.191 X |

FOREIGN PATENT DOCUMENTS

| | | |
|---|---|---|
| 0 285 259 | 10/1988 | European Pat. Off. . |
| 0 285 260 | 10/1988 | European Pat. Off. . |
| 0 457 086 | 9/1994 | European Pat. Off. . |
| 2 024 422 | 12/1971 | Germany . |
| 35 28 364 | 2/1987 | Germany . |
| 38 20 838 | 1/1990 | Germany . |
| 35 45 747 | 10/1994 | Germany . |

*Primary Examiner*—Elizabeth L. Dougherty
*Attorney, Agent, or Firm*—Spencer & Frank

[57] ABSTRACT

An assembly for applying a torque from an output shaft to an input shaft of an apparatus, such as a multishaft extruder, and for measuring the applied torque. The assembly includes a connecting sleeve for torque-transmittingly coupling the output shaft with the input shaft; and a torque measuring device having expansion measuring strips, a signal amplifier, a transmitting ring antenna and a receiving antenna. The connecting sleeve has a first length portion carrying the expansion measuring strips and a second length portion carrying the signal amplifier and the transmitting ring antenna. A torque-transmitting arrangement torque-transmittingly couples solely the first length portion of the connecting sleeve with the output shaft and the input shaft, so that the second length portion of the connecting sleeve is free from a torque-transmitting connection with the input shaft.

4 Claims, 2 Drawing Sheets

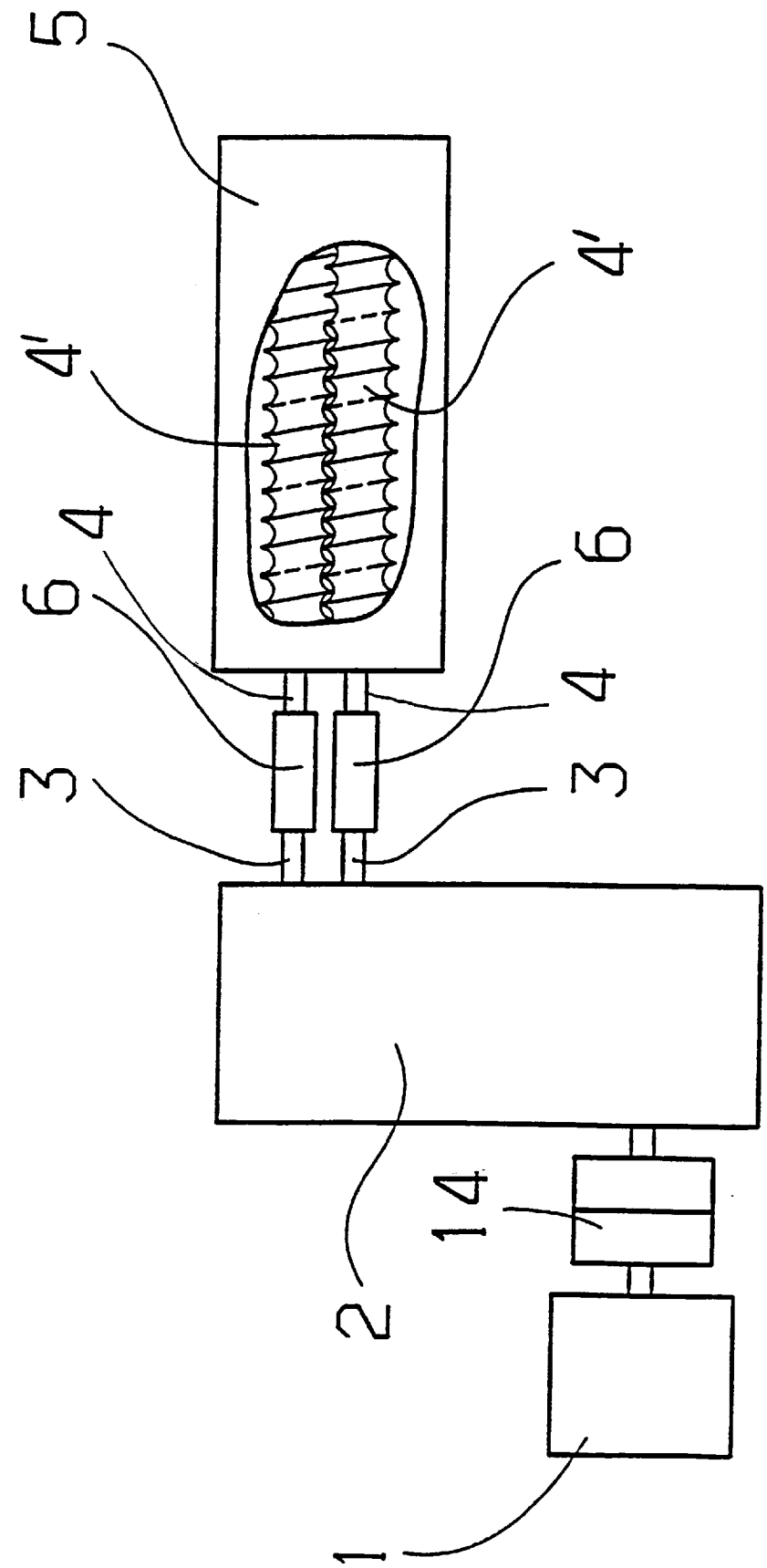

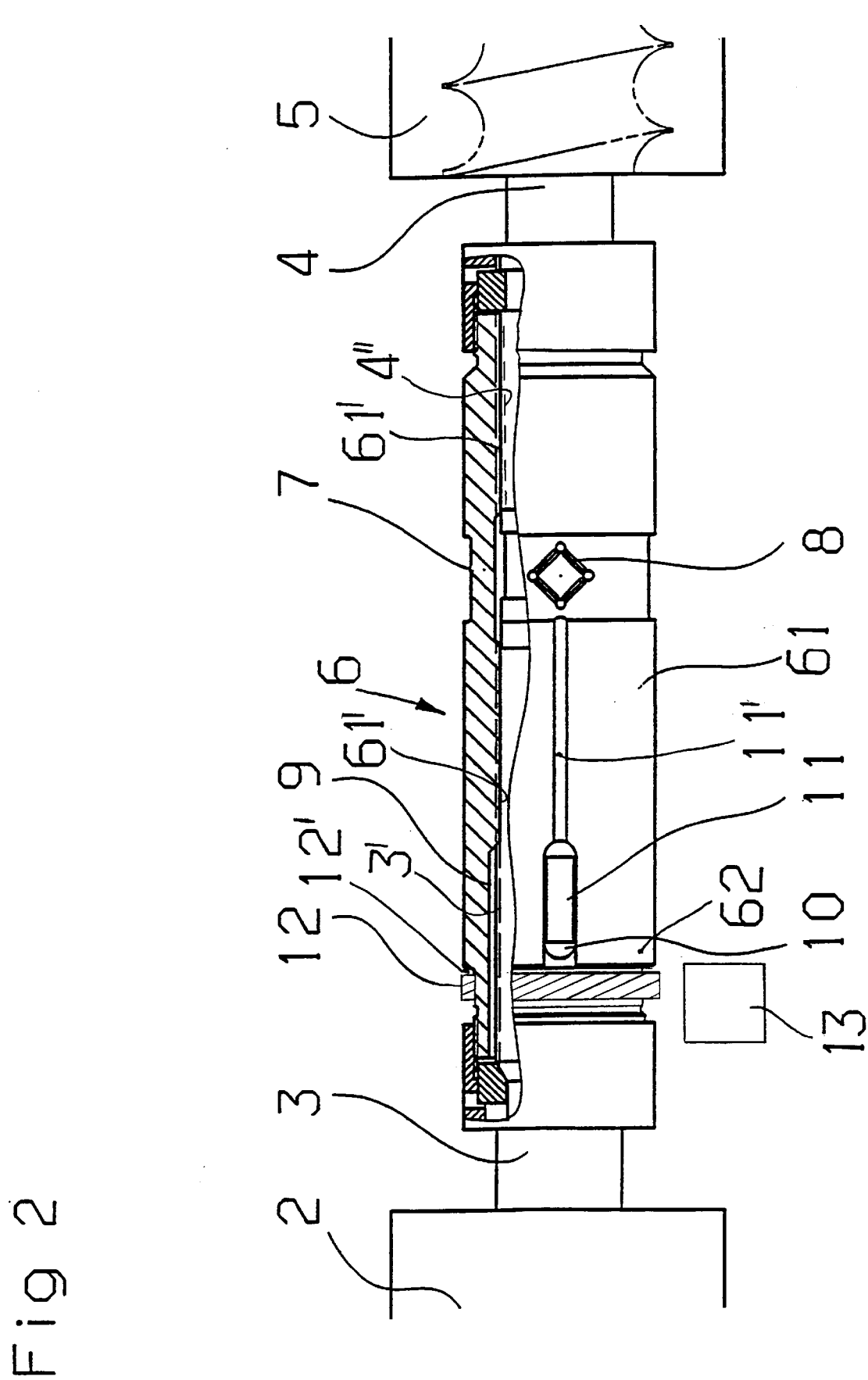

TORQUE MEASURING DEVICE PARTICULARLY FOR A MULTISHAFT EXTRUDER

CROSS REFERENCE TO RELATED APPLICATION

This application claims the priority of German Application No. 195 15 130.5 filed Apr. 25, 1995, which is incorporated herein by reference.

BACKGROUND OF THE INVENTION

This invention relates to an apparatus for measuring the torque applied to a driven shaft, particularly to the individual worm conveyor shafts of a multishaft extruder.

Striving for ever-increasing output rates in multishaft worm conveyor extruders requires ever-increasing drive outputs and thus inherently higher input torques for the worm conveyor shafts. Also, the ever-improving process technology makes possible a continuous operation of the machine at almost 100%.

Because of the above requirements, the worm conveyor shafts of current design can be used only with very low safety values as far as their strength is concerned. A breakage of a worm conveyor shaft in a multishaft machine causes not only an interruption in the production, but also results in significant consequential damages to the extrusion part and in the machine drive. Further, the division of the output among several worm conveyor shafts is not uniform. In case of a two-shaft machine with unidirectionally driven, right-pitch worm conveyor shafts, the left-hand shaft—as viewed in the direction of conveyance—is stressed to a greater extent. For this reason a very accurate torque monitoring of each individual worm conveyor shaft is required.

European Patent No. 0 457 086 discloses a contactless measuring of the local torque input in worm conveyor-type extruder machines. For this purpose, in the conveyor housing a plurality of path sensors are arranged which scan the surface of the worm conveyor shaft during its rotation. For an improved scanning, the screw conveyor shafts are provided with notches or grooves. In addition, at the drive clutch, externally of the worm conveyor housing, a separate measuring unit is arranged which delivers a reference pulse from a location of the extruder machine where the shaft is not yet exposed to torsion. Such reference signal is compared and evaluated in a computer with signals generated in the housing. Such a complex and expensive measuring process cannot be used for multishaft worm conveyor machines; even in a single-shaft machine its use is of questionable value when viscous synthetic materials are handled. Also, the prior art system is limited to a monitoring of rotating shafts and therefore the torque of an immobilized (blocked) shaft remains undetected.

SUMMARY OF THE INVENTION

It is an object of the invention to provide an improved apparatus of the above-outlined type which determines the torque on each individual worm conveyor shaft without significant additional expense by means of conventional expansion measuring strips in a multishaft extrusion machine having interengaging worm conveyors with worm conveyor shafts that are in a close, side-by-side relationship.

This object and others to become apparent as the specification progresses, are accomplished by the invention, according to which, briefly stated, the assembly for applying and measuring the torque from an output shaft to an input shaft of an apparatus, such as a multishaft extruder, includes a connecting sleeve for torque-transmittingly coupling the output shaft with the input shaft; and a torque measuring device having expansion measuring strips, a signal amplifier, a transmitting ring antenna and a receiving antenna. The connecting sleeve has a first length portion carrying the expansion measuring strips and a second length portion carrying the signal amplifier and the transmitting ring antenna. A torque-transmitting arrangement torque-transmittingly couples solely the first length portion of the connecting sleeve with the output shaft and the input shaft, so that the second length portion of the connecting sleeve is free from a torque-transmitting connection with the input shaft and the output shaft.

By virtue of the, construction of the connecting sleeve coupling the output shaft of the drive with the input shaft of a respective worm conveyor of a multishaft worm conveyor-type extruder, the known expansion measuring strips, the signal amplifier and the ring antenna could be surprisingly successfully mounted on a structural component which is present in any event in the machine and which may be replaced in a simple manner.

According to a further advantageous feature of the invention, the torque-transmitting part of the connecting sleeve is provided with a circumferential groove for receiving the expansion measuring strips, while the torque-free part of the connecting sleeve is provided with a circumferential groove for receiving the ring antenna and is further provided with an axial groove for accommodating the measuring amplifier. In this arrangement a monitoring of the shaft may be effected even if the distance between the connecting sleeves is less than 1 mm.

It is a further advantage of the invention that all existing multishaft worm conveyor extruders may be retrofitted by a simple replacement of the connecting sleeve and thus an rpm-monitoring of the individual shafts is feasible.

BRIEF DESCRIPTION OF THE DRAWINGS

FIG. 1 is a schematic side elevational view of a two-shaft worm conveyor-type extruding machine.

FIG. 2 is an axial, partially sectional view of a connecting sleeve structured according to the invention.

DESCRIPTION OF THE PREFERRED EMBODIMENT

Turning to FIG. 1, an electric drive motor 1 is coupled to a gearing 2 by means of a clutch 14. The output shafts 3 of the drive are torque-transmittingly coupled with the worm conveyor input shafts 4 by means of respective connecting sleeves 6. The worm conveyor elements 4' are mounted on their respective shafts 4 in axial alignment therewith.

Turning to FIG. 2, each connecting sleeve 6 is formed of a torque-transmitting length portion 61 and a torque-free length portion 62. The torque-transmitting part 61 has inner keys 61' which interengage with splines 3' of the output shaft 3 and with splines 4' of the worm conveyor shaft 4 and consequently the output shaft 3 is torque-transmittingly coupled to the worm conveyor shaft 4 by the part 61 of the connecting sleeve 6. The torque-transmitting part 61 has a shallow outer circumferential groove 7 into which expansion measuring strips 8 are glued. It is noted that a determination of input torques by means of expansion measuring strips bonded (glued) on a rotary shaft is, by itself, a conventional process. The groove 7 is required if—as it is often the case—the parallel-extending coupling sleeves 6 have a clearance from one another which is less than 1 mm. The torque-free part 62 of the coupling sleeve 6 has no keys or other coupling elements, so that no torque-transmitting connection exists between the sleeve part 62 and the splines 3' of the output shaft 3 of the gearing 2.

From the circumferential groove 7 of the part 61 an axially parallel groove 10 extends to a circumferential groove 12' provided in the outer face of the part 62. A ring antenna 12 is seated in the circumferential groove 12', and externally of the connecting sleeve 6, in the immediate vicinity of the ring antenna 12, a receiving antenna 13 is positioned which is stationarily supported by a non-illustrated machine component (machine frame or bracket). The axial groove 10 accommodates a measuring value amplifier 11 which connects the expansion measuring strips 8 with the transmitting ring antenna 12 by means of a conductor 11'. The receiving antenna 13 receives the signals from the transmitting ring antenna 12 and applies the signals to a non-illustrated limit value setter or a computer.

Since each coupling sleeve 6 of a multishaft worm conveyor-type extruding machine is provided with the measuring system constructed according to the invention and described in connection with FIG. 2, the torque input for each individual shaft may be accurately monitored. The measuring system which is thus situated externally of the extruder housing 5 is not affected by the product preparation and also permits a measurement of the torque of a jammed (blocked) shaft.

Because the measuring system according to the invention is integrated in an already-existing component which has been altered only to an insignificant extent, the measuring system may be replaced at any time, and a further advantage resides in the fact that the existing machines may be retrofitted in a simple manner.

It will be understood that the above description of the present invention is susceptible to various modifications, changes and adaptations, and the same are intended to be comprehended within the meaning and range of equivalents of the appended claims.

What is claimed is:

1. In an assembly for applying a torque from an output shaft to an input shaft and for measuring the applied torque; the assembly including a connecting sleeve for torque-transmittingly coupling the output shaft with the input shaft; and a torque measuring device having expansion measuring strips, a signal amplifier, a transmitting ring antenna and a signal receiving means for receiving signals from said transmitting ring antenna;

the improvement wherein said connecting sleeve has
   (a) a first length portion carrying said expansion measuring strips;
   (b) a second length portion carrying said signal amplifier and said transmitting ring antenna; and
   (c) torque-transmitting means for torque-transmittingly coupling solely said first length portion of said connecting sleeve with the output shaft and the input shaft, whereby said second length portion of said connecting sleeve is free from a torque-transmitting connection with the input shaft.

2. The assembly as defined in claim 1, wherein said connecting sleeve has a longitudinal axis; further comprising
   (a) a first circumferential groove provided in said first length portion and receiving said expansion measuring strips;
   (b) a second circumferential groove provided in said second length portion and receiving said transmitting ring antenna; and
   (c) a generally axially extending groove provided in said second length portion and receiving said signal amplifier.

3. An extruder comprising
   (a) a drive having an output shaft;
   (b) a worm conveyor having an input shaft;
   (c) a connecting sleeve torque-transmittingly coupling said output shaft with said input shaft; said connecting sleeve having
      (1) a first length portion being torque-transmittingly coupled to said output shaft and said input shaft; and
      (2) a second length portion being free from a torque-transmitting connection with said output shaft; and
   (d) a torque measuring device including
      (1) expansion measuring strips mounted on said first length portion;
      (2) a signal amplifier mounted on said second length portion and connected to said expansion measuring strips;
      (3) a transmitting ring antenna mounted on said second length portion and connected to said signal amplifier; and
      (4) signal receiving means situated externally of said connecting sleeve for receiving signals emitted by said ring antenna.

4. The extruder as defined in claim 3, wherein said connecting sleeve has a longitudinal axis; further comprising
   (a) a first circumferential groove provided in said first length portion and receiving said expansion measuring strips;
   (b) a second circumferential groove provided in said second length portion and receiving said ring antenna; and
   (c) a generally axially extending groove provided in said second length portion and receiving said signal amplifier.

* * * * *